US012789419B2

(12) United States Patent
Johnson et al.

(10) Patent No.: US 12,789,419 B2
(45) Date of Patent: Nov. 10, 2026

(54) POLYMER MOLDING OF UNDERSEA CABLES AND CONNECTION USING ADDITIVE MANUFACTURING

(71) Applicant: The United States of America, as Represented by the Secretary of the Navy, Crane, IN (US)

(72) Inventors: Matthew Johnson, Springville, IN (US); Joshua M. Jeffers, Loogootee, IN (US); William Riggins, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 167 days.

(21) Appl. No.: 18/635,571

(22) Filed: Apr. 15, 2024

(65) Prior Publication Data

US 2024/0342961 A1 Oct. 17, 2024

Related U.S. Application Data

(60) Provisional application No. 63/459,284, filed on Apr. 14, 2023.

(51) Int. Cl.
*B29C 33/38* (2006.01)
*B29C 45/26* (2006.01)
(Continued)

(52) U.S. Cl.
CPC ...... *B29C 33/3842* (2013.01); *B29C 33/3835* (2013.01); *B29C 45/261* (2013.01); (Continued)

(58) Field of Classification Search
CPC . B29C 33/3835; B29C 33/3842; B29C 37/02; B29C 45/1711; B29C 45/2669; B29L 2031/3462; B29L 2031/36
See application file for complete search history.

(56) References Cited

U.S. PATENT DOCUMENTS

2016/0089823 A1* 3/2016 Ikeda .................. B29C 45/2669 264/272.13
2021/0162692 A1* 6/2021 Rao .................. B29D 11/00038

FOREIGN PATENT DOCUMENTS

CN 110216814 A * 9/2019 ............. B29C 33/00
CN 114211668 A * 3/2022 ............. B29C 39/10

OTHER PUBLICATIONS

Stratasys Objet1000Plus User Guide retrieved from <https://support.stratasys.com/en/Printers/PolyJet-Legacy/Objet1000-Plus> (Year: 2017).*

(Continued)

*Primary Examiner* — Seyed Masoud Malekzadeh
*Assistant Examiner* — Vipul Malik
(74) *Attorney, Agent, or Firm* — Naval Surface Warfare Center, Crane Division; Christopher Feigenbutz

(57) ABSTRACT

Provided is a method of polymer molding of cables and connections, such as undersea cables and connections using additive manufacturing. Design requirements for cables/connections, including form, fit, and function data is provided. The requirements are used to produce a three-dimensional model of a mold, which is converted into a file format that allows for three-dimensional printing and computer-aided manufacturing. A mold is printed utilizing a UV cured resin on a high resolution three-dimensional printer. The mold is then checked to ensure it meets form, fit, and function data. Finally, an cable/connection is molded by mixing polyurethane, injecting it into the mold, and baking. The disclosed method provides significant time and cost savings when compared to prior art steel and aluminum mold manufacturing.

7 Claims, 6 Drawing Sheets

(51) Int. Cl.

| | |
|---|---|
| ***B29C 45/73*** | (2006.01) |
| ***B29C 64/112*** | (2017.01) |
| ***B29C 64/35*** | (2017.01) |
| ***B29C 64/386*** | (2017.01) |
| ***B29K 75/00*** | (2006.01) |
| ***B29L 31/00*** | (2006.01) |
| ***B33Y 30/00*** | (2015.01) |
| ***B33Y 40/20*** | (2020.01) |
| ***B33Y 50/00*** | (2015.01) |
| ***B33Y 80/00*** | (2015.01) |
| *B29B 13/00* | (2006.01) |
| *B29C 45/00* | (2006.01) |
| *B29C 64/40* | (2017.01) |

(52) U.S. Cl.

CPC .......... *B29C 45/2669* (2013.01); *B29C 45/73* (2013.01); *B29C 64/112* (2017.08); *B29C 64/35* (2017.08); *B29C 64/386* (2017.08); *B33Y 30/00* (2014.12); *B33Y 40/20* (2020.01); *B33Y 50/00* (2014.12); *B33Y 80/00* (2014.12); *B29B 2013/005* (2013.01); *B29C 45/0053* (2013.01); *B29C 2045/0077* (2013.01); *B29C 64/40* (2017.08); *B29K 2075/00* (2013.01); *B29K 2875/00* (2013.01); *B29K 2995/0026* (2013.01); *B29L 2031/707* (2013.01); *B29L 2031/7278* (2013.01)

(56) References Cited

OTHER PUBLICATIONS

Conathane EN-1556 Technical Data Sheet retrieved from <https://www.chemical-concepts.com/wp-content/uploads/2024/04/CONATHANE-EN-1556-TDS.pdf?srsltid=AfmBOooM7gum5r3lvOENadZr0wir7nRpUFOOuFR_-KiuJIIQoGLM55aB> (Year: 2019).*

Conap MR-5002 retrieved from <https://webaps.ellsworth.com/edl/Actions/?document=1882&language=en> (Year: 2018).*

* cited by examiner

POLYMER MOLDING OF UNDERSEA CABLES AND CONNECTION USING ADDITIVE MANUFACTURING

CROSS-REFERENCE TO RELATED APPLICATIONS

The present application claims priority to U.S. Provisional Patent Application Ser. No. 63/459,284, filed Apr. 14, 2023, entitled "POLYMER MOLDING OF UNDERSEA CABLES AND CONNECTION USING ADDITIVE MANUFACTURING," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 211529US02) is assigned to the United States Government and is available for licensing for commercial purposes. Licensing and technical inquiries may be directed to the Technology Transfer Office, Naval Surface Warfare Center Crane, email: Crane_T2@navy.mil.

FIELD OF THE INVENTION

The field of invention relates generally to additive manufacturing. More particularly, it pertains to a device and method of polymer molding of undersea cables and connection using additive manufacturing.

BACKGROUND

Mold fabrication has historically been a barrier to entry and a schedule driver for business and the government to produce undersea cables and connections. Traditional molds are made of either steel or coated aluminium, and these materials require precision machining, particularly in surface finishing requirements. Steel and aluminium molds cost anywhere from $15,000-$20,000 each depending on size and take 6-12 months to produce and cut into production. These high costs and long lead times create a strain on the undersea cables and connection industry.

The steps involved with current mold manufacturing include the production of CAD models and official/approved GD&T drawings for every mold, use of a machine shop with equipment that can produce steel or aluminium molds, and retooling for even slight modifications. This manufacturing method requires very precise surface finish requirements (mirror finish), leading to high cost and extended production time. Often these molds are not desirable workload for machine shops as they are custom one time jobs (which also increases costs). The review process for official/approved GD&T drawings adds a significant amount of time to the engineering process prior to contract solicitation.

As is evident from the above, a new means of producing undersea cables and connections with reduced cost and lead times is needed.

SUMMARY OF THE INVENTION

The present invention relates to a method of polymer molding of cables and connections, such as undersea cables and connections using additive manufacturing. Design requirements for cables/connections, including form, fit, and function data is provided. The requirements are used to produce a three-dimensional model of a mold, which is converted into a file format that allows for three-dimensional printing and computer-aided manufacturing. A mold is printed utilizing a UV cured resin on a high resolution three-dimensional printer. The mold is then checked to ensure it meets form, fit, and function data. Finally, an cable/connection is molded by mixing polyurethane, injecting it into the mold, and baking. The disclosed method provides significant time and cost savings when compared to prior art steel and aluminum mold manufacturing.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
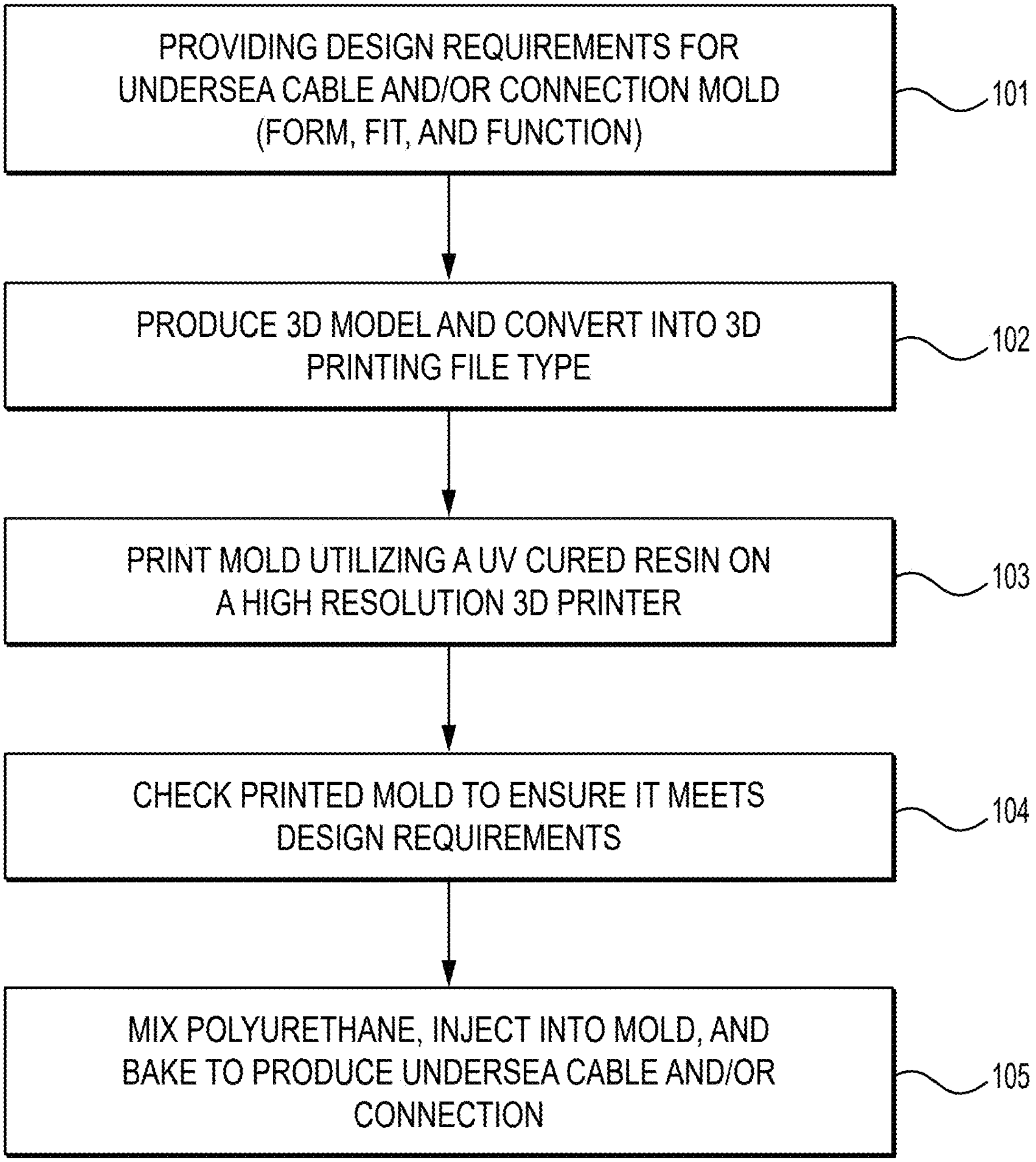
FIG. 1 shows an exemplary method of molding cables and connections using additive manufacturing as disclosed herein according to aspects of the present disclosure.

The embodiments of the invention described herein are not intended to be exhaustive or to limit the invention to precise forms disclosed. Rather, the embodiments selected for description have been chosen to enable one skilled in the art to practice the invention.

Generally, provided is a method of molding cables and connections using additive manufacturing comprising: providing design requirements for a cable and/or connection, wherein the design requirements comprise form, fit, and function data for the cable and/or connection; wherein the form, fit, and function data includes mold envelope dimensions, mating surface information, design space size and shape limitations, raw cable dimensions, and cable layout requirements; taking the form, fit, and function data for the cable and/or connection and utilizing computer aided drafting to produce a three-dimensional model of a mold, wherein the mold is designed to meet the form, fit, and function data for the cable and/or connection; exporting the three-dimensional model into a file format that allows for three-dimensional printing and computer-aided manufacturing, wherein the file contains three-dimensional mold printing data; loading the file containing three-dimensional mold printing data onto a three-dimensional printer; printing the mold utilizing a transparent UV cured resin with a resolution down to 16 microns; removing the mold from the printer, cleaning support material from the mold, and checking the mold to ensure it meets the form, fit, and function data; verifying dimensions with a coordinate measuring machine to ensure surface finish requirements of 64 microns for a cavity and 125 microns for all other aspects of the mold, and measuring the final component to verify shrink rates were accounted for properly; applying a mold release composition to ensure that the urethane does not adhere to the mold and applying a heat source of 140° F. to allow for mold release composition adherence to the mold; molding one or more cables utilizing the mold, comprising the steps of: mixing an polyurethane composition; degassing to ~30" of mercury using a vacuum chamber; removing the preheated mold from the heat source and preparing for injection of the polyurethane once degassing is completed; injecting the polyurethane into the mold until the polyurethane fills a mold overflow reservoir; allowing the mold and the polyurethane to rest for one hour at room temperature; applying a heat source of 180° F. to the mold for at least 16 hours; removing the mold from the heat source; allowing the mold to cool to room temperature for one hour prior to removing molded cable and/connector assembly from mold; disassembling the mold and remove molded parts; and deflashing the molded cable and/connector assembly.

In an illustrative embodiment, the file format is selected from the group consisting of OBJ, STI. VRML, X3G, PLY, FBX, 3MF, AMF, AND GCODE. In an illustrative embodiment, the three-dimensional printer is a Stratasys Objet 1000 Plus three-dimensional printer. In an illustrative embodiment, the UV cured resin composition is Stratasys veroclear polyjet UV cured resin. In an illustrative embodiment, the polyurethane composition is EN-1556 polyurethane part A and B utilizing a 100:33 ratio. In an illustrative embodiment, provided is a method of molding cables and connections using additive manufacturing comprising: providing design requirements for a cable and/or connection, including form, fit, and function data; using the design requirements to produce a three-dimensional model of a mold; converting the three-dimensional model into a file format that allows for three dimensional printing and computer-aided manufacturing; printing a mold utilizing a UV cured resin on a three-dimensional printer; and checking the mold to ensure it meets form, fit, and function data.

In an illustrative embodiment, provided is a method of molding one or more cables utilizing a mold produced by additive manufacturing, comprising the steps of: providing a mold produced by additive manufacturing; applying a mold release composition to the mold to and applying a heat source to a the mold at 140° F. to allow for mold release composition adherence to the mold; mixing a polyurethane composition and degassing to ~30" of mercury using a vacuum chamber; removing the mold from the heat source and preparing for injection of the polyurethane composition once degassing is completed; injecting the polyurethane composition into the mold until the polyurethane composition fills a mold overflow reservoir; allowing the mold and the polyurethane to rest for one hour at room temperature; applying a heat source of 180° F. to the mold for at least 16 hours; removing the mold from the heat source; allowing the mold to cool to room temperature for one hour prior to removing molded cable and/connector assembly from mold; disassembling the mold and remove molded parts; and deflashing the molded cable and/connector assembly. FIG. 1 shows an exemplary method of molding cables and connections using additive manufacturing as disclosed herein according to aspects of the present disclosure. As shown, block 101 includes providing design requirements for undersea cable and/or connection mold (form, fit, and function). Block 102 includes producing a three-dimensional model and converting into three-dimensional printing file format. Block 103 includes printing a mold utilizing a UV cured resin on a high resolution three-dimensional printer. Block 104 includes checking the printed mold to ensure it meets design requirements (form, fit, and function). Block 105 includes mixing polyurethane, injecting into mold, and bake to produce undersea cable and/or connection. The exemplary steps will be disclosed in greater detail below.

In an illustrative embodiment, the method includes the steps of: providing design requirements for the undersea cables, including form, fit, and function data. As can be appreciated, form, fit, and function data describes the identifying characteristics of a part. Form data refers to the size, shape, dimensions, mass/weight and other visual characteristics of a part. Fit data refers to the ability of a part to interface with, connect to, or become integrated into another part. Function data refers to the action(s) that a part is designed to perform.

In an illustrative embodiment, form, fit, and function data includes the requirements necessary to produce a three-dimensional model for one or more undersea cables and/or connection molds. The model data is then converted into a file format that allows for three-dimensional printing and computer-aided manufacturing. In an illustrative embodiment, the three-dimensional printing file format is selected from the group consisting of OBJ, STI. VRML, X3G, PLY, FBX, 3MF, AMF, AND GCODE.

In an illustrative embodiment, the three-dimensional file format is loaded into a printer for printing. The mold is printed utilizing a UV cured resin on a high resolution three-dimensional printer. In an illustrative embodiment, the printer is an Stratasys Objet1000 Plus three-dimensional printer, which is a printer that can print models simultaneously with different model materials. The Stratasys Objet1000 Plus three-dimensional enables a user to choose from a wide range of mechanical properties, such as from flexible to rigid. The Stratasys Objet1000 Plus three-dimensional printer also permits the printing of models made from different materials on the same build tray in the same print job.

Once printed, the mold is checked to ensure it meets form, fit, and function data, as described above. Finally, an undersea cable is molded by mixing polyurethane, injecting it into the mold, and baking. The disclosed method provides significant time and cost savings when compared to prior art steel and aluminum mold manufacturing.

Figure 2:
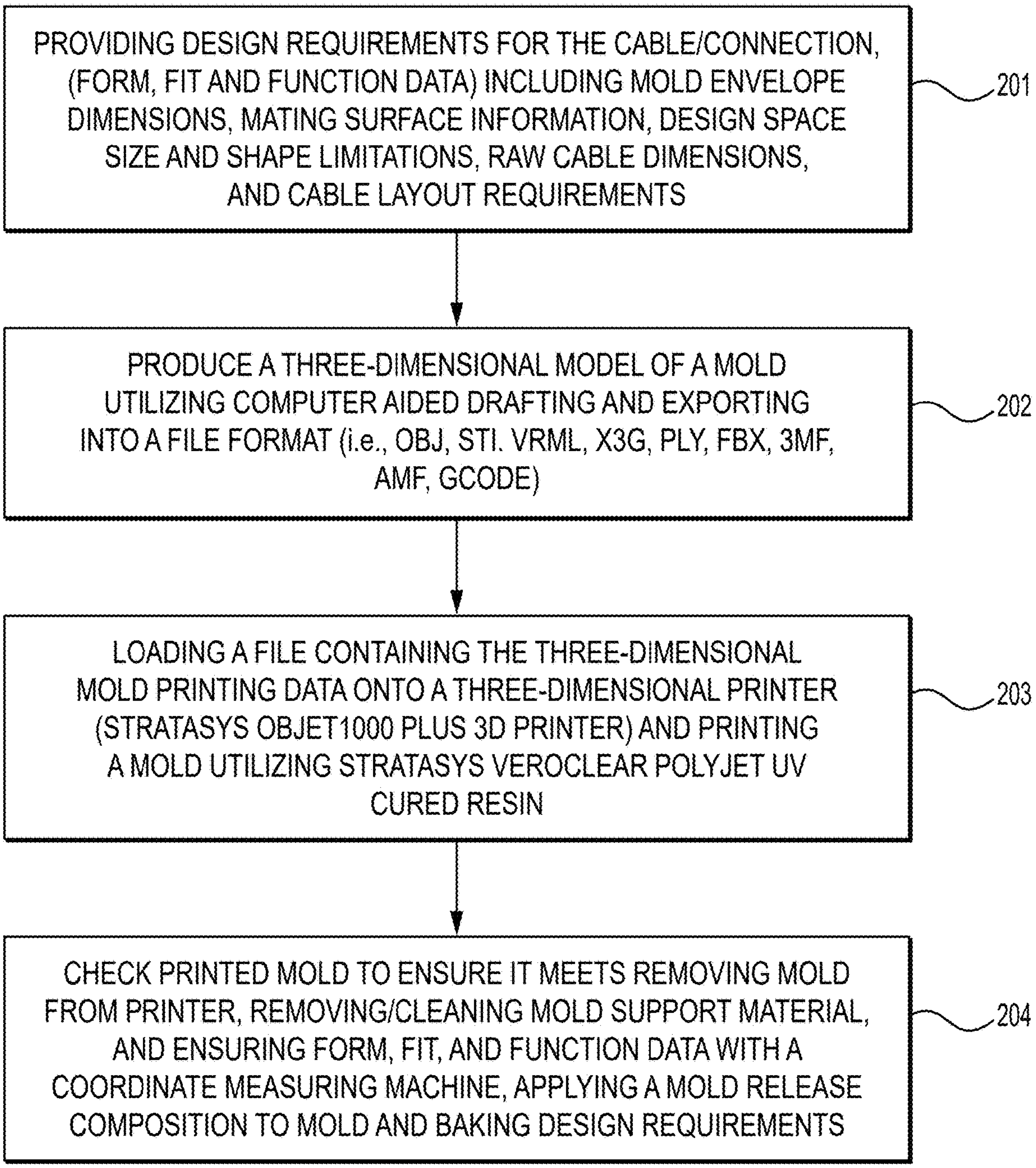
FIG. 2 shows an exemplary method of producing a mold for use in molding cables and connections using additive manufacturing as disclosed herein according to aspects of the present disclosure.

FIG. 2 shows an exemplary method of producing a mold for use in molding cables and connections using additive manufacturing as disclosed herein according to aspects of the present disclosure. In an illustrative embodiment, the method of molding cables and connection using additive manufacturing begins and block 201, which includes providing design requirements for the undersea cables, wherein the design requirements comprise form, fit, and function data for the cable as described above. In an illustrative embodiment, form, fit, and function data includes mold envelope dimensions, mating surface information, design space size and shape limitations, raw cable dimension, and cable layout requirements.

Once the design requirements are completed, block 202 includes utilizing computer aided drafting to produce a three-dimensional model of a mold. The completed three-dimensional model is exported into a file format that allows for rapid prototyping, three-dimensional printing and computer-aided manufacturing. In an illustrative embodiment, the three-dimensional printing file format is selected from the group consisting of OBJ, STI. VRML, X3G, PLY, FBX, 3MF, AMF, AND GCODE.

Block 203 includes loading the file containing the three-dimensional mold printing data onto a three-dimensional printer. In an illustrative embodiment, the printer is an Stratasys Objet1000 Plus three-dimensional printer. The mold is then printed. In an illustrative embodiment, the mold is printed utilizing Stratasys veroclear polyjet UV cured resin. VeroClear is a transparent material that is similar to polymethyl methacrylate (also known as acrylic). Veroclear is an alternative to glass and is often used for concept modeling and design verification of transparent parts such as eyewear, light covers and medical devices. In an illustrative embodiment, the mold is printed with a resolution down to 16 microns.

Block 204 includes removing the mold after printing, and removing/cleaning support material from of the mold. The printed mold is then checked to ensure it meets the form, fit, and function data. In an illustrative embodiment, dimensions are verified with a coordinate measuring machine to ensure surface finish requirements of 64 microns for a cavity and 125 microns for all other aspects of the mold, and measuring the final component to ensure that shrink rates were accounted for properly.

Once all measurements are verified, a mold release composition is applied to the mold to ensure that the urethane does not adhere to the mold during cable molding. The urethane is baked it into the mold in an oven at 140° F. to allow for mold release composition adherence to the mold.

Figure 3:
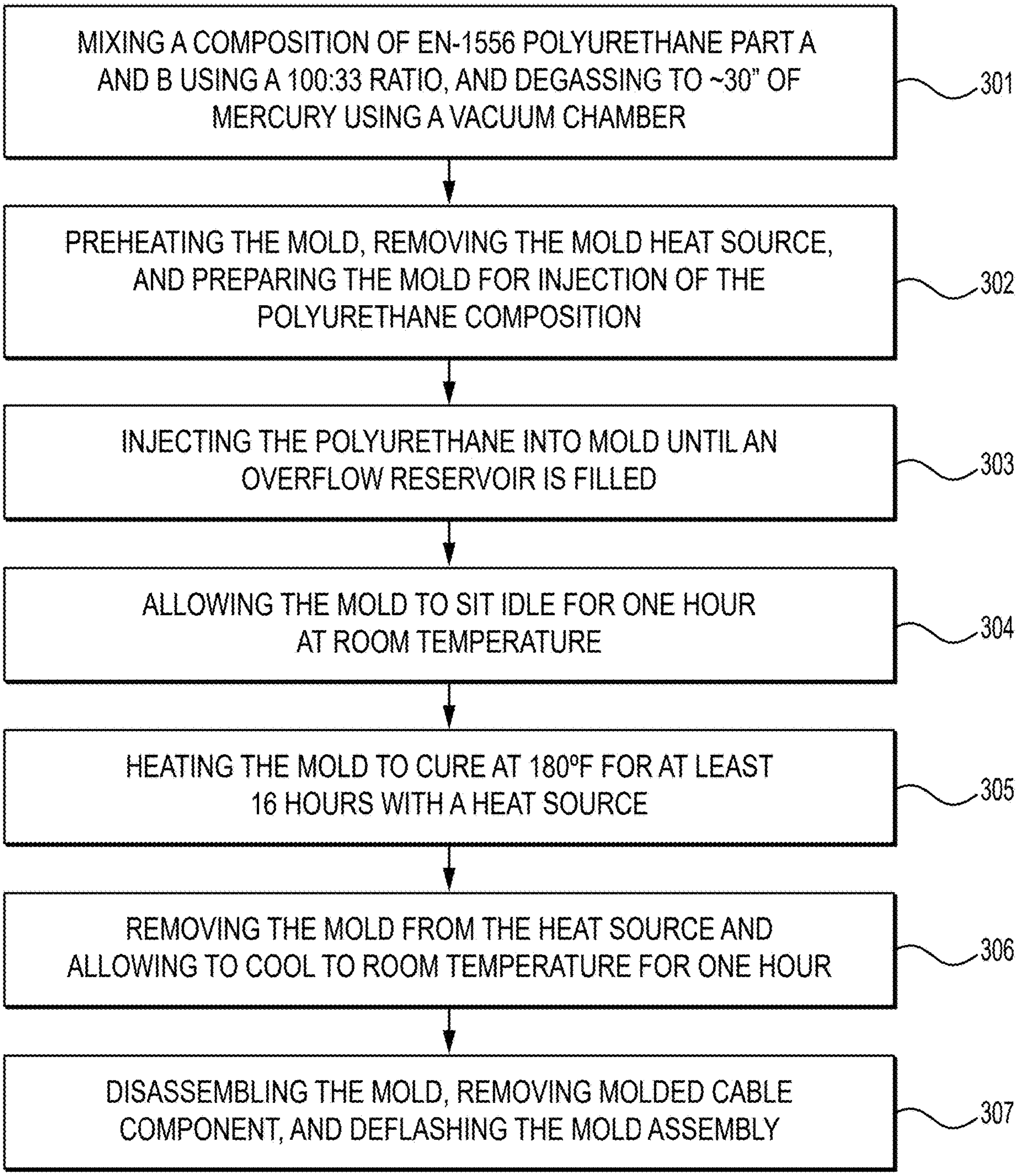
FIG. 3 shows an exemplary method of molding cables and connections using additive manufacturing as disclosed herein according to aspects of the present disclosure.

FIG. 3 shows an exemplary method of molding cables and connections using additive manufacturing as disclosed herein according to aspects of the present disclosure. In an illustrative embodiment, one or more cables are molded utilizing the mold. Block 301 includes mixing a composition of EN-1556 polyurethane part A and B using a 100:33 ratio, and degassing to ~30" of mercury using a vacuum chamber. At block 302, the mold is preheated, removed from the oven, and prepared for injection of the polyurethane composition while degassing occurs. At block 303, the polyurethane is slowly injected into mold until the material fills an overflow reservoir formed into the mold. At block 304, the filled mold sits idle for one hour at room temperature. At block 305, the filled mold is heated by placing into an oven or with heated platens to cure at 180° F. for at least 16 hours. At block 306, the mold is removed from the heat source and allowed to cool to room temperature for one hour prior to removal from the mold. At block 307, the mold is disassembled, the molded cable component is removed, and the mold assembly is deflashed. The steps can be repeated as often as desired.

Figure 4:
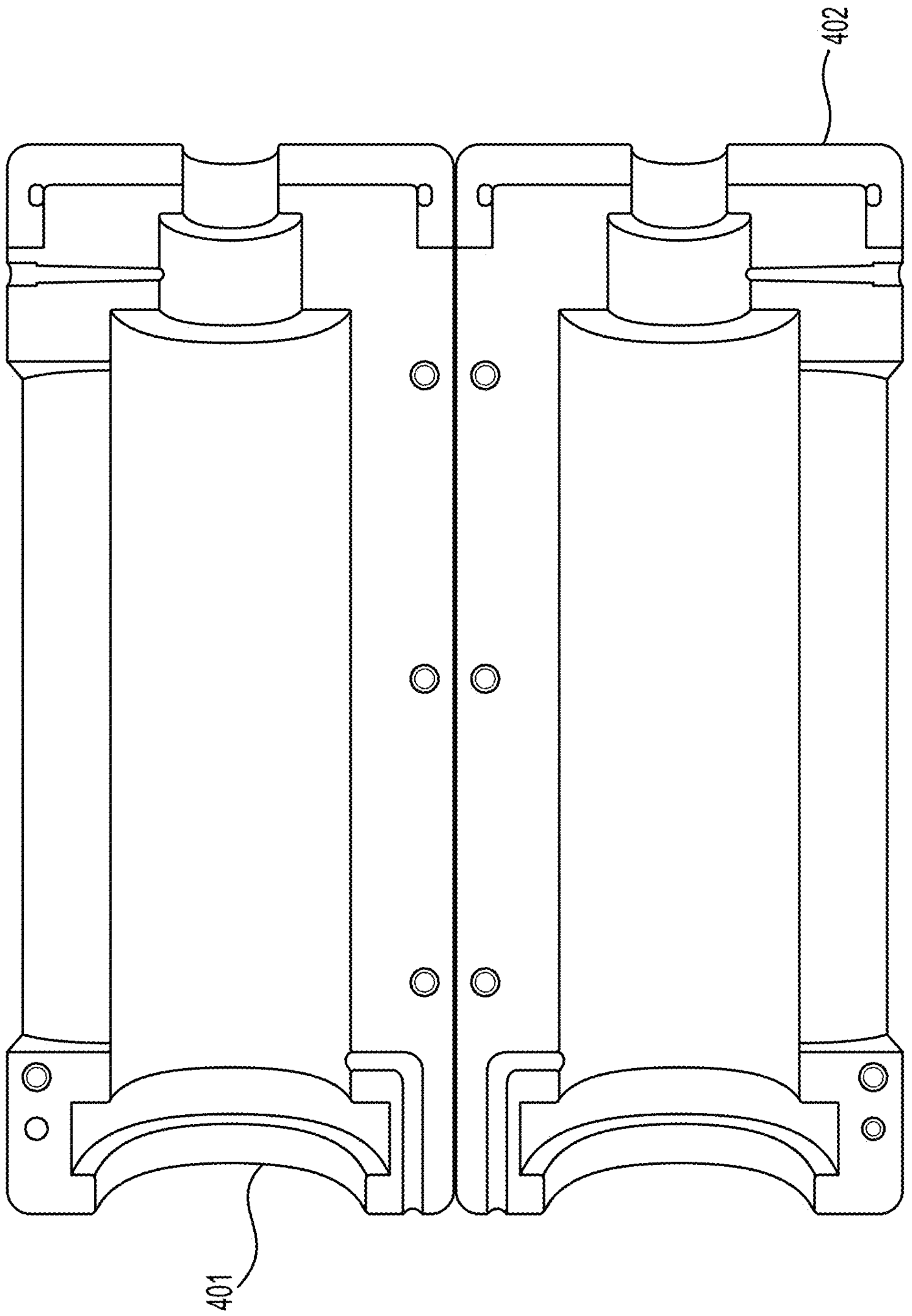
FIG. 4 shows an upper and a lower mold produced by an exemplary method disclosed herein.
Figure 5A:
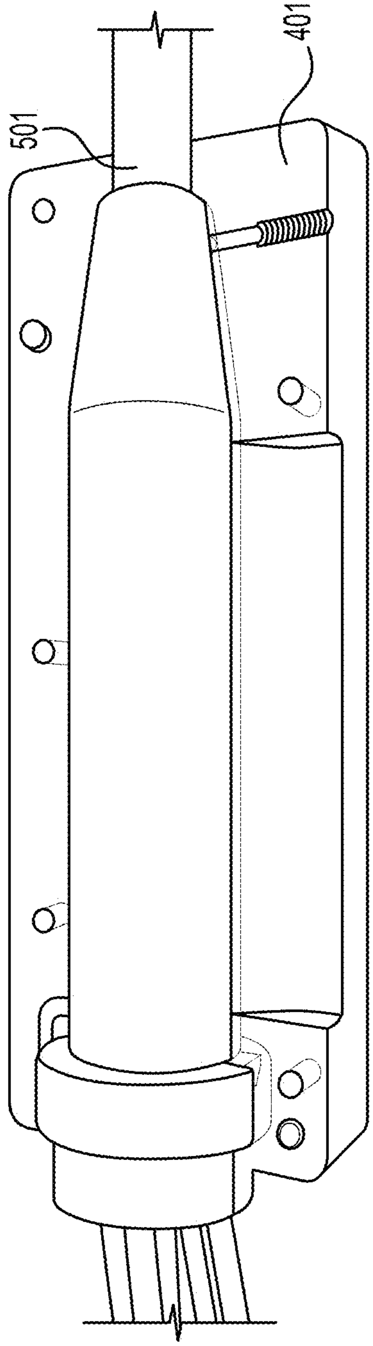
FIG. 5 shows an upper and a lower mold with a cable molded by an exemplary method disclosed herein.
Figure 5B:
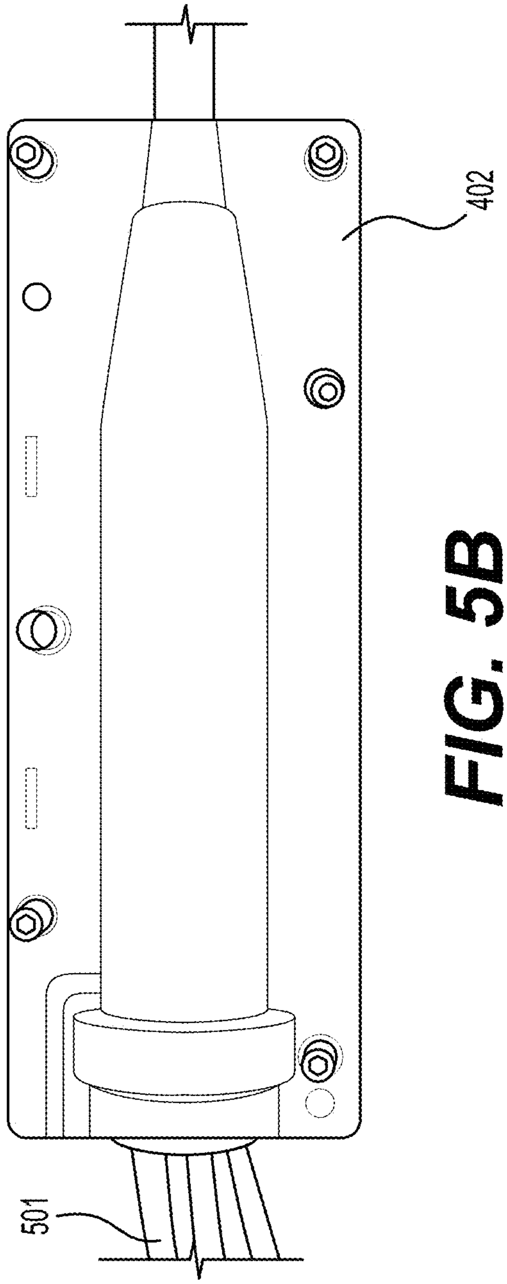
Figure 6:
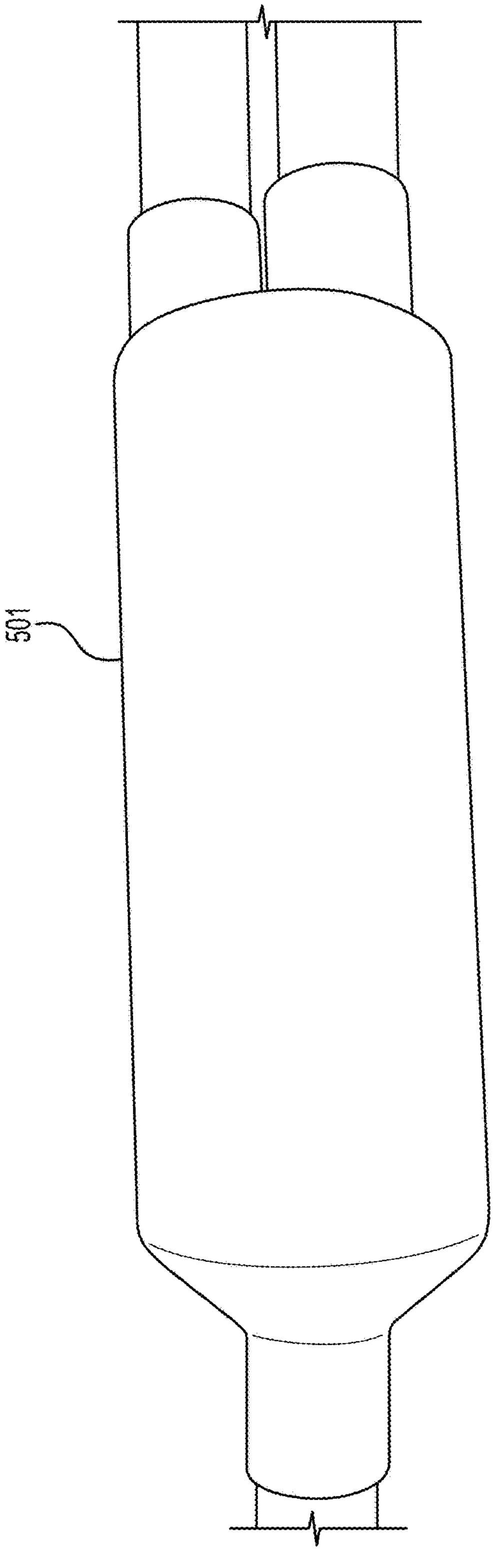
FIG. 6 shows a cable molded by an exemplary method disclosed herein.

FIG. 4 shows an upper 401 and a lower 402 mold that was produced by an exemplary method disclosed herein, FIG. 5 shows an upper 401 and a lower 402 mold with a cable 501 that was molded by an exemplary method disclosed herein, and FIG. 6 shows a cable 501 that was molded by an exemplary method disclosed herein. In an illustrative embodiment, the use of clear mold material provides reduced part defects and rework due to the fact that technicians can see the material flowing through the mold 401, 402 and orient the device in a way that air entrapments can move out prior to the material curing. In an illustrative embodiment, any desired size, shape, and configuration of cables 501 or connections can be produced with the exemplary method described herein. The desired configuration for the cables 501 or connections can be accounted for in the design requirements, and can be printed utilizing the steps disclosed herein.

Although the invention has been described in detail with reference to certain preferred embodiments, variations and modifications exist within the spirit and scope of the invention as described and defined in the following claims.

The invention claimed is:

1. A method of molding cables and connections using additive manufacturing comprising:

providing design requirements for a cable and/or connection, wherein said design requirements comprise form, fit, and function data for said cable and/or connection;

wherein said form, fit, and function data includes mold envelope dimensions, mating surface information, design space size and shape limitations, raw cable dimensions, and cable layout requirements;

taking said form, fit, and function data for said cable and/or connection and utilizing computer aided drafting to produce a three-dimensional model of a mold, wherein said mold is designed to meet said form, fit, and function data for said cable and/or connection;

exporting said three-dimensional model into a file format that allows for three-dimensional printing and computer-aided manufacturing, wherein a file contains three-dimensional mold printing data;

loading said file containing said three-dimensional mold printing data onto a three-dimensional printer;

printing said mold utilizing a transparent UV cured resin with a resolution down to 16 microns;

removing said mold from said three-dimensional printer, cleaning support material from said mold, and checking said mold to ensure it meets said form, fit, and function data;

verifying dimensions with a coordinate measuring machine to ensure surface finish requirements of 64 microns for a cavity and 125 microns for all other aspects of said mold, and measuring a final component to verify shrink rates were accounted for properly;

applying a mold release composition to ensure that said urethane does not adhere to said mold and applying a heat source of 140° F. to allow for mold release composition adherence to said mold;

molding one or more cables utilizing said mold, comprising said steps of:

mixing a polyurethane composition;

degassing to ~30" of mercury using a vacuum chamber;

removing a preheated mold from said heat source and preparing for injection of said polyurethane composition once degassing is completed;

injecting said polyurethane composition into said mold until said polyurethane composition fills a mold overflow reservoir;

allowing said mold and said polyurethane composition to rest for one hour at room temperature;

applying a heat source of 180° F. to said mold for at least 16 hours;

removing said mold from said heat source of 180° F.;

allowing said mold to cool to room temperature for one hour prior to removing molded cable and/or connector assembly from said mold;

disassembling said mold and remove molded parts; and deflashing said molded cable and/or connector assembly.

2. The method of claim 1, wherein said file format is selected from a group consisting of OBJ, STI, VRML, X3G, PLY, FBX, 3MF, AMF, AND GCODE.

3. The method of claim 1, wherein said polyurethane composition is EN-1556 polyurethane part A and B utilizing a 100:33 ratio.

4. A method of molding cables and connections using additive manufacturing comprising:

providing design requirements for a cable and/or connection, including form, fit, and function data;

wherein said form, fit, and function data includes mold envelope dimensions, mating surface information, design space size and shape limitations, raw cable dimensions, and cable layout requirements;

using said design requirements to produce a three-dimensional model of a mold;

converting said three-dimensional model into a file format that allows for three dimensional printing and computer-aided manufacturing;

printing said mold utilizing a UV cured resin on a three-dimensional printer; and checking said mold to ensure it meets said form, fit, and function data; and verifying dimensions with a coordinate measuring machine to ensure surface finish requirements of 64 microns for a cavity and 125 microns for all other aspects of said mold, and measuring a final component to verify shrink rates were accounted for properly.

5. The method of claim 4, wherein said file format is selected from a group consisting of OBJ, STI, VRML, X3G, PLY, FBX, 3MF, AMF, AND GCODE.

6. A method of molding one or more cables utilizing a mold produced by additive manufacturing, comprising said steps of:

providing the mold produced by additive manufacturing;

providing design requirements for a cable and/or connection, wherein said design requirements comprise form, fit, and function data for said cable and/or connection;

wherein said form, fit, and function data includes mold envelope dimensions, mating surface information, design space size and shape limitations, raw cable dimensions, and cable layout requirements;

applying a mold release composition to said mold and applying a heat source to said mold at 140° F. to allow for mold release composition adherence to said mold;

mixing a polyurethane composition and degassing to ~30" of mercury using a vacuum chamber;

removing said mold from said heat source and preparing for injection of said polyurethane composition once degassing is completed;

injecting said polyurethane composition into said mold until said polyurethane composition fills a mold overflow reservoir;

allowing said mold and said polyurethane composition to rest for one hour at room temperature; applying a heat source of 180° F. to said mold for at least 16 hours;

removing said mold from said heat source of 180° F.;

allowing said mold to cool to room temperature for one hour prior to removing molded cable and/or connector assembly from mold;

disassembling said mold and remove molded parts;

deflashing said molded cable and/or connector assembly, and verifying dimensions with a coordinate measuring machine to ensure surface finish requirements of 64 microns for a cavity and 125 microns for all other aspects of said mold, and measuring a final component to verify shrink rates were accounted for properly.

7. The method of claim 6, wherein said polyurethane composition is EN-1556 polyurethane part A and B utilizing a 100:33 ratio.

* * * * *